June 3, 1952     F. D. ROBIE     2,598,940
COLLAPSIBLE COVER FOR VEHICLES

Filed May 20, 1950     2 SHEETS—SHEET 1

Frank D. Robie
INVENTOR
By: Leslie M. Hansen
HIS ATTORNEY

June 3, 1952  F. D. ROBIE  2,598,940
COLLAPSIBLE COVER FOR VEHICLES
Filed May 20, 1950  2 SHEETS—SHEET 2

Frank D. Robie
INVENTOR
By Leslie M. Hansen
HIS ATTORNEY.

Patented June 3, 1952

2,598,940

UNITED STATES PATENT OFFICE 2,598,940

COLLAPSIBLE COVER FOR VEHICLES

Frank D. Robie, San Jose, Calif.

Application May 20, 1950, Serial No. 163,277

4 Claims. (Cl. 135—1)

This invention relates to collapsible covers and more particularly to improvements in such type covers for adapting them for use as a shelter for vehicles.

Various forms of collapsible covers have been made and used in the past and while they are capable of forming a covering none of them are constructed for properly securing to a vehicle to withstand the elements and to remain secure despite heavy winds.

The present invention has as its object to provide an improved collapsible cover so constructed for affixation between the ground and the vehicle covered in a novel and economical manner.

Another object is to provide an improved collapsible cover for vehicles with a solid center bar and yieldable connecting means cooperable to affix the cover relative to the vehicle so as to prevent the cover from engaging and scratching the finish of the vehicle.

These and other objects and advantages will become apparent from a reading of the following description in the light of the drawings in which.

Figure 1:
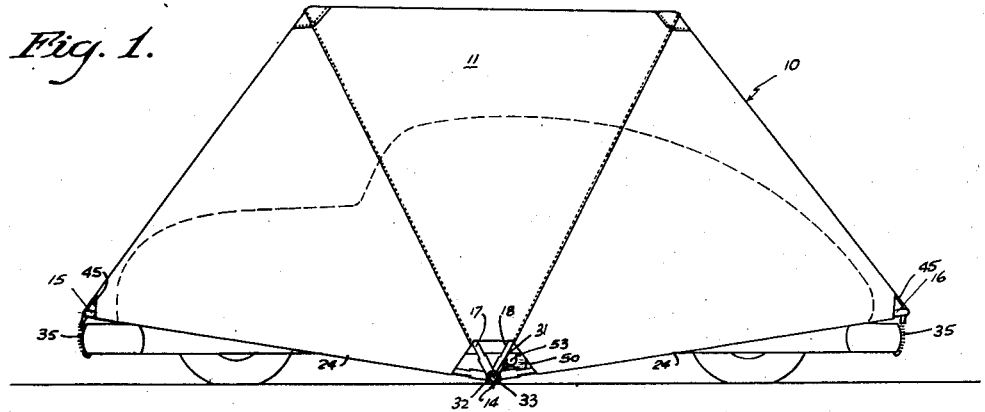
Figure 1 is a side elevation of a collapsible cover embodying my invention and covering a vehicle.

Referring to the drawings a collapsible cover is generally indicated by reference number 10. This cover 10 may be of any size or shape suitable for the purpose to which the cover is to be put. The cover includes the usual waterproof sheet 11, preferably canvas, adapted to be stretched over a frame 12.

The frame 12 comprises a plurality of bows 13 pivotally secured to a solid cross bar 14 for swinging movement between collapsed and opened condition. In the present disclosure four bows are shown, two of which constitute fore and aft bows 15 and 16, while the remaining bows are considered intermediate bows 17 and 18. It should be apparent that the number of intermediate bows may vary from one to several of them as necessity may require.

Figure 3:
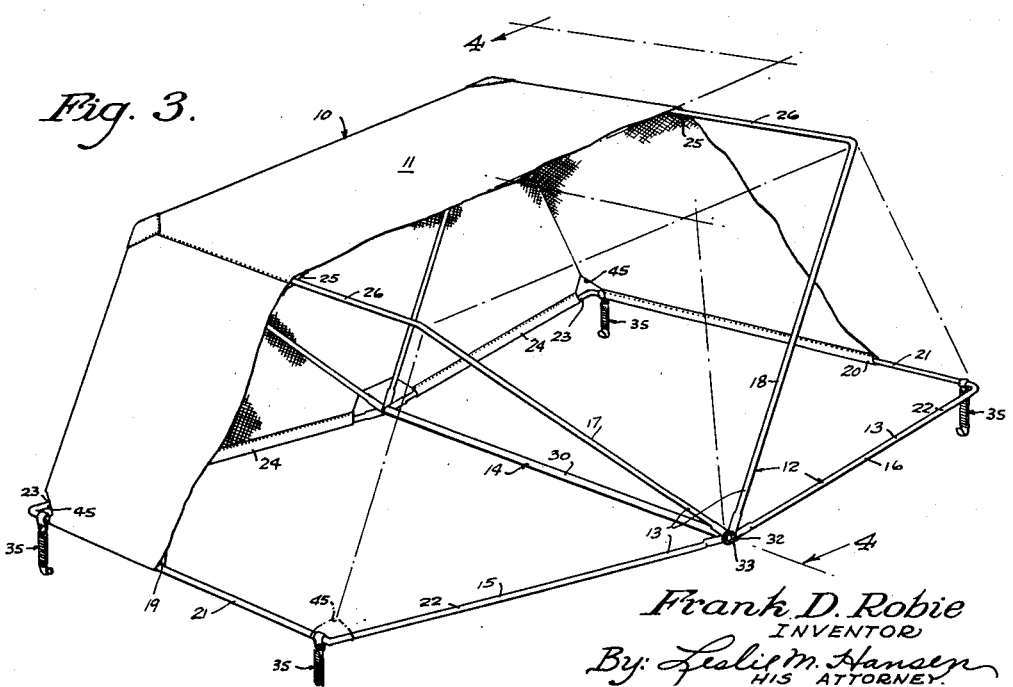
Figure 3 is a perspective view of my improved collapsible cover with part of the canvas thereof broken away to better illustrate the frame therefor.
Figure 4:
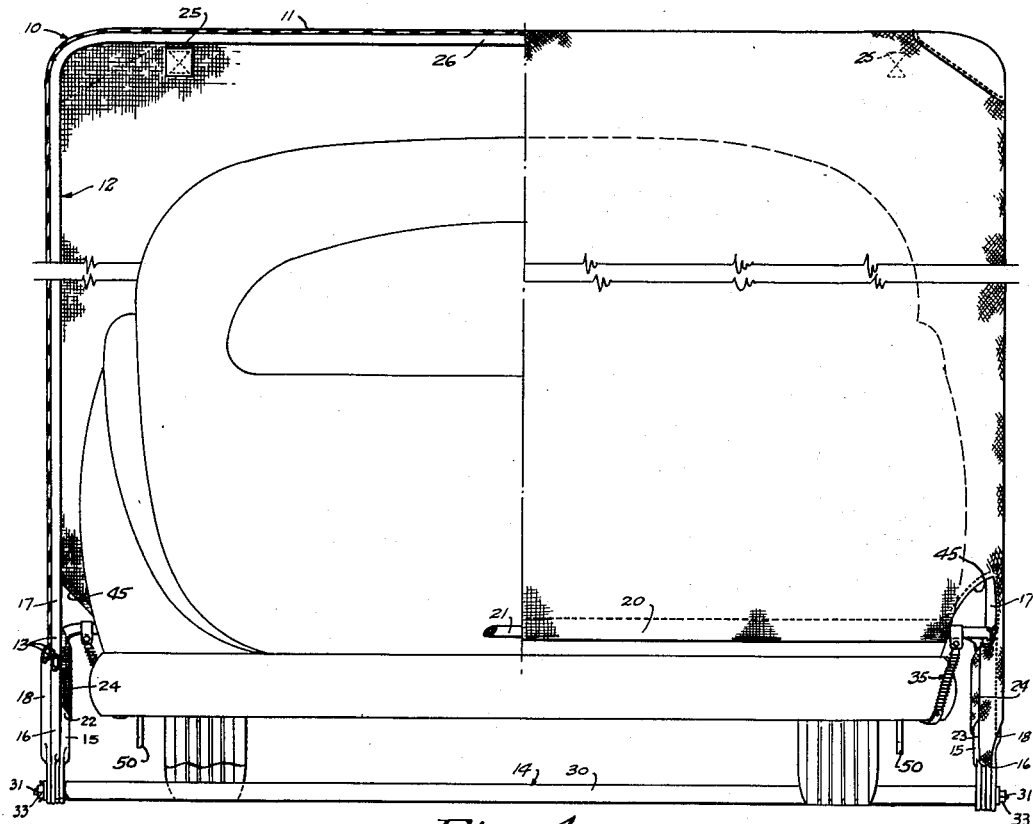
Figure 4 is a section of Figure 3 taken substantially along line 4—4 thereof and covering a vehicle.

The canvas sheet 11 is hemmed at its fore and aft ends 19 and 20 and these hems are adapted to surround the bight portions 21 of each of the fore and aft bows 15 and 16, respectively. The legs 22 and 23 of each bow 15 and 16 are also surrounded by hems 24, as best seen in Figs. 3 and 4, so that when the frame 12 is opened up the canvas sheet 11 is thereby stretched tightly over the intermediate bows of the frame. In this connection it will be noted in Figure 4 that straps 25 are provided to loosely secure the bight portion 26 of each intermediate bow to the canvas sheeting 11. In this manner the canvas fits the form of the frame 12 and presents a neat appearing cover for vehicles and the like.

Figure 7:
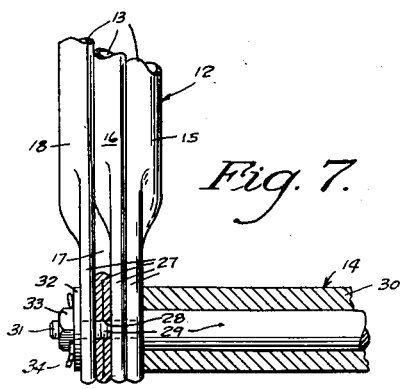
Figure 7 is a fragmentary section, partially in elevation, of the solid center bar and the pivotal connection of the frame structure of the collapsible cover.

The bows 13 are preferably light weight metal tubing of substantial rigidity and the legs of these bows are flattened at their free ends 27 as best seen in Figure 7 so as to fit as close as possible to each other. Each flattened end 27 is drilled to provide a hole 28 therein for receiving a tie rod 29 forming a part of the cross bar 14. This tie rod extends across the entire frame structure through the legs on either side thereof. A tubular sleeve 30 is mounted upon the tie rod to maintain the legs of the bows on either side of the frame at the desired spacing from each other. The free ends 31 of the tie rod 29 are threaded, a washer 32 is placed against the outermost leg, and a nut 33 is threadedly connected to the free ends 31 of rod 29 to secure the legs thereto for pivotal movement. The nuts 33 and free ends 31 of rod 29 are provided with alignable holes to receive a cotter key 34.

The cross bar 14 thus formed, in addition to forming a pivotal connection for the free ends of the legs of the bows 13, serves to rigidify the frame 12 and to keep the side walls of the collapsible cover 10 parallel to each other. The cross bar 14 also serves as a foot member for engaging the surface upon which the vehicle to be covered stands. In this manner the cover 10 actually stands independently of the vehicle.

Figures 5, 6:
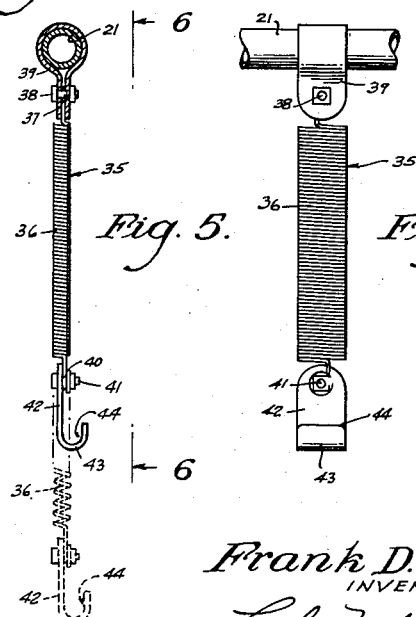
Figure 5 is a side view of one of the yieldable connecting means shown in Figure 3 and connected to the frame of the collapsible cover, part of which is shown in section.
Figure 6 is an elevational view of Figure 5 as seen from line 6—6 therein.

The cover 10 also carries a plurality of yieldable means 35 for connecting the cover to the vehicle. Details of one of these yieldable means are shown in Figs. 5 and 6. In the preferred embodiment the yieldable means comprises a tension spring 36, it being apparent that any form of sturdy elastic webbing or the like may be used in place of the springs.

In the present disclosure each spring 36 has its upper eye 37 suitably connected by bolt 38 to a loop strap 39 which embraces the bight portion 21 of either the fore or aft bows 15 and 16 as the case may be. The opposite eye 40 of each spring is likewise secured by a bolt 41 to a strap 42 having its free end 43 bent into the form of a hook 44.

It will be noted in Figs. 3 and 4 that the loop straps 39 are connected to the fore and aft bows adjacent the legs thereof. At this point the canvas sheeting is cut away as at 45 to expose the bow structure. Any number of yieldable means 35 may be employed on each fore and aft bow but the minimum requirement is two on each such bow so as to uniformly stretch the canvas sheeting over the frame.

As illustrated in Fig. 3 the hooks 44 are inwardly disposed for connection to the lower edge of the front and rear bumpers of the vehicle as the case may be, see Fig. 1. In this connection it will be noted that the tension springs 36 are extended so as to exert a substantial pull lengthwise of the sheeting 11 to stretch the same over the frame 12. Moreover, since the cross bar 14 serves as a foot for engaging the surface upon which the vehicle is supported, it will be apparent that the springs 36 tend to firmly press the bar 14 against such surface. From the foregoing it is clear that the cover 10 does not rest upon the vehicle although connected thereto at the front and rear of the vehicle. Consequently, the open cover is firmly secured relative to the vehicle which is substantially enclosed by the cover 10.

Although one form of vehicle is shown in the drawings, any other form thereof, even a motorcycle can be covered by substantially the same arrangement of frame and sheeting. In any case, the hook members 44 need only be secured to some part of the vehicle whether it be the frame thereof, the fenders or any other part suitable to be engaged by the hooks.

In preparing the collapsible cover for connection to any vehicle, the cover 10 is initially in collapsed condition. It is laid on the ground or pavement with the cross bar 14 disposed perpendicular to the front or rear wheels of the vehicle. Such wheels of the vehicle are then rolled over the cross bar until the latter is disposed substantially midway the front and rear of the vehicle. Thereafter it is a simple operation to spread the bows 13, hook the yieldable means 35 at one end of the vehicle and then stretch the cover sheeting 11 until the yieldable means adjacent the opposite end of the vehicle can be hooked to the vehicle.

Figure 2:
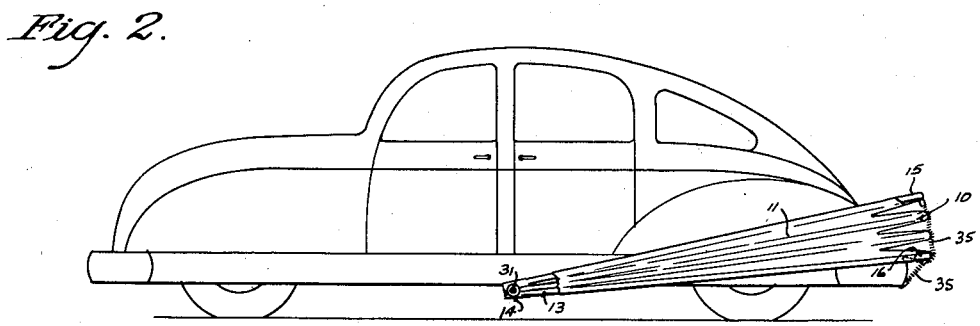
Figure 2 is a side elevation of the vehicle of Figure 1 showing my collapsible cover in collapsed condition and secured to the vehicle.
Figure 8:
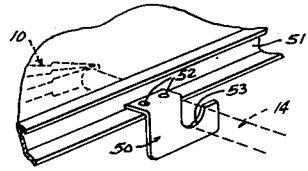
Figure 8 is a fragmentary perspective of a portion of a vehicle chassis and a hanger member forming a part of the present invention.

In uncovering the vehicle a reversal of the steps just explained is followed until the collapsible cover again rests upon the ground in collapsed condition. The vehicle may then be driven away from the collapsed cover. However, if desired, the cover may be attached to the vehicle in collapsed condition for movement therewith. This feature is illustrated in Fig. 2 and includes a pair of hanger members 50 one of which is shown in Fig. 8. The hanger members 50 are secured to the chassis 51 of the vehicle in any suitable manner, as for example, by bolts 52. The hangers 50 are formed to provide a recess 53 adapted to receive the cross bar 14 to support the same well above the surface upon which the vehicle rolls.

In connection with the foregoing, the bight portions of the several bows 13 are suitably supported on the rear bumper of the vehicle to which they are secured by straps, not shown, the yieldable means 35 also serving as a securing means. As shown in Fig. 2 the yieldable means carried by the front bow 15 surround the several bows 13 and their hooks 44 engaging the top edge of the rear bumper to hold the bows 13 together. The yieldable means on the rear bow 16 engages the lower edge of the rear bumper to maintain the collapsed cover 10 in a secure position thereon.

While I have described my improved collapsible cover for vehicles in specific detail, it will be apparent that these details may be varied, modified and/or altered without departure from the spirit of my invention. I, therefore, desire to avail myself of all variations, modifications and alterations as fairly come within the scope of the invention as hereafter claimed.

What I claim as new and desire to protect by Letters Patent is:

1. In a collapsible cover for vehicles composed of a plurality of bows having the free ends of their legs pivotally connected and having waterproof sheeting connected to said bows so as to be stretched over the latter when they are spread out, the combination therewith of a ground engaging cross bar having its ends extending through the free ends of the legs of said bows to provide the pivotal connection for said bows, and a plurality of yieldable means each having one end thereof secured to the outermost ones of said bows and the opposite end thereof adapted to be secured to an adjacent portion of the vehicle covered to thereby stretch said sheeting over said bows and urge said cross bar into bearing engagement with the surface supporting the vehicle.

2. In a collapsible cover of the type including plural bows having waterproof sheeting secured thereto so as to be stretched thereby into a shelter for a vehicle, the combination therewith of a tie rod for pivotally connecting the legs of said plural bows together, a spacer sleeve carried by said tie rod for maintaining the side walls of said cover in parallelism, means on said tie rods for securing the legs of said bows thereon, said sheeting being of such length as to limit movement of the outermost ones of said bows to a disposition of less than 180° from each other on the sheet supporting side thereof whereby said spacer sleeve will engage the surface upon which the vehicle covered rests and the bight portions of the outermost bows are spaced slightly above the fore and aft ends of the chassis of said vehicle, and yieldable means carried by the outermost bows for securing the latter to the fore and aft ends of the chassis of said vehicle in a manner to stretch said sheeting tightly over all of said bows and maintain said spacer sleeve securely against the surface upon which the vehicle rests.

3. In a collapsible cover for vehicles including a frame having a plurality of bows secured to a sheet of fabric, the combination therewith of a tie rod having its ends extending through the ends of the legs of said bows for connecting them pivotally to each other, means on said tie rod for maintaining the legs of said bows in spaced parallel relation to each other, means on each end of said tie rod for securing the legs of said bows thereto for pivotal movement, said sheet of fabric being of a length to limit pivotal spreading of said bows with respect to each other from closed position to a disposition in which the outermost bows are less than 180° from each other, whereby said tie bar forms a single central foot for engaging the surface upon which the vehicle covered rests, and yieldable means for securing the outermost bows to said vehicle for urging said foot against the surface upon which the vehicle rests.

4. In a collapsible cover for a vehicle including a plurality of bows covered by a sheet of waterproof material and adapted to have the free ends of their legs connected for swinging movement between open and closed position; the combination therewith of a tie rod having its ends extending through the free ends of the legs of said bows to provide pivotal connection therefor on either side of said cover, yieldable means on the fore and aft bows of said plurality of bows adapted for attachment to an adjacent part of the vehicle to be covered for stretching said sheet of waterproof material tightly over said plurality of bows, means on said tie rod for maintaining the legs of said bows at either end of said tie rod in spaced parallel relationship whereby said tie rod engages the surface upon which said vehicle rests for providing a crosswise foot for said cover midway its fore and aft ends counteracting the downward thrust of said cover effected by said yieldable means.

FRANK D. ROBIE.

REFERENCES CITED

The following references are of record in the file of this patent:

UNITED STATES PATENTS

| Number | Name | Date |
|---|---|---|
| 1,650,111 | Byne | Nov. 22, 1927 |
| 1,775,145 | Tennant et al. | Sept. 9, 1930 |

FOREIGN PATENTS

| Number | Country | Date |
|---|---|---|
| 221,489 | Switzerland | Aug. 17, 1942 |
| 696,115 | Germany | Sept. 11, 1940 |